United States Patent [19]

Tanabe

[11] Patent Number: 4,827,634
[45] Date of Patent: May 9, 1989

[54] THREE-TERMINAL CAPACITOR
[75] Inventor: Takeshi Tanabe, Fukui, Japan
[73] Assignee: Murata Manufacturing Co., Ltd., Kyoto, Japan
[21] Appl. No.: 770,142
[22] Filed: Aug. 27, 1985
[30] Foreign Application Priority Data
   Aug. 29, 1984 [JP] Japan .................. 59-131508[U]
[51] Int. Cl.[4] .............................. H01G 1/14
[52] U.S. Cl. .............................. 361/306
[58] Field of Search ............. 361/306, 308, 309, 310, 361/321 C, 433 C, 304, 400, 402, 404, 301; 29/25.42; 339/278 M; 338/325, 329

[56] References Cited
   U.S. PATENT DOCUMENTS

| | | | |
|---|---|---|---|
| 2,619,519 | 11/1952 | Marks | 29/25.42 X |
| 3,111,612 | 11/1963 | Lehmann | 361/301 |
| 3,348,568 | 10/1967 | Stark et al. | 361/321 |
| 3,381,081 | 4/1968 | Schalliol | 338/329 X |
| 3,519,889 | 7/1970 | Monaco | 361/400 X |
| 3,793,604 | 2/1974 | Duggan et al. | 338/329 X |

Primary Examiner—Donald A. Griffin
Attorney, Agent, or Firm—Wenderoth, Lind & Ponack

[57] ABSTRACT

A lead terminal-drawing out construction in a three-terminal capacitor wherein a dielectric substrate is provided with electrodes on both main surfaces thereof, two pieces of lead terminal extending from one of the electrodes, and one piece of lead terminal extending from another one of the electrodes. A lead terminal connected to one electrode is bent toward a lead terminal connected to other electrode whereby three pieces of lead terminal are arranged in almost the same plane. The bent portion of the lead terminal is formed by a first bent portion bent toward an opposite lead terminal and a second bent portion so as to be parallel to an opposite lead terminal, the first bent portion being once bent in an outwardly projecting direction relative to the dielectric substrate to increase a bending angle of the first bent portion of the lead terminal preventing the inclination of the capacitor when the three-terminal capacitor is automatically inserted into a printed board thus preventing breakage of the dielectric substrate.

5 Claims, 2 Drawing Sheets

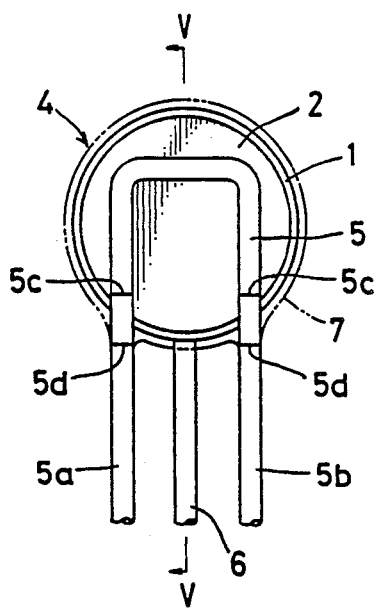
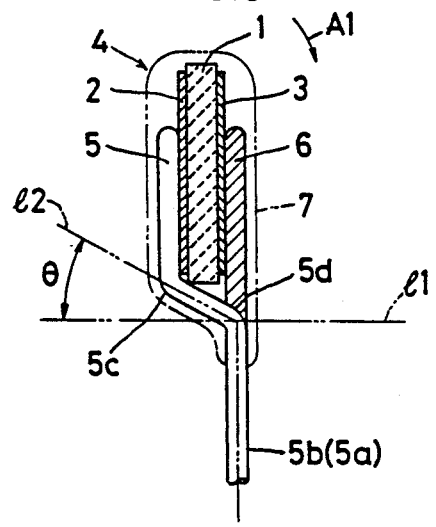

THREE-TERMINAL CAPACITOR

The present invention relates to a three-terminal capacitor suitably used for a noise filter in which three pieces of lead terminal are drawn out from a capacitor body, in particular to a bending construction for arranging lead terminals drawn out from a capacitor body in almost the same plane.

FIGS. 4 and 5 show the construction of the conventional three-terminal capacitor.

Figure 3:
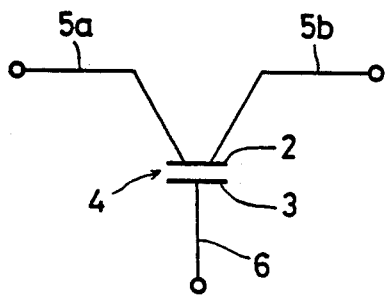

Referring now to FIGS. 4 and 5, a capacitor body 4 comprises a disc-like dielectric substrate 1 made of ceramics provided with an electrode 2 and an electrode 3 formed on both opposite main surfaces thereof, respectively, a lead wire 5 bent in a U-shape being connected with the electrode 2 by soldering, both leg portions of the lead wire 5 extending from the capacitor body 4 as an input lead terminal 5a and an output lead terminal 5b, respectively. An earth lead terminal 6 is connected with the other electrode 3 by soldering. The earth lead terminal 5 extends from the capacitor body 4 in the same direction as the input lead terminal 5a and ther output terminal 5b, and the capacitor body 4 is coated with an insulating resin 7. A three-terminal capacitor having the above described construction and an equivalent circuit as shown in FIG. 3 is generally known.

Each input lead terminal 5a and output lead terminal 5b, as shown in FIG. 5, is bent toward the earth lead terminal 6 at a first bent portion 5c adjacent to an edge portion of the main surface of the electrode 2 side of the dielectric substrate 1 and further bent parallel to the earth lead terminal 6 at a second bent portion 5d adjacent an edge portion of the main surface of the electrode 3 side of the dielectric substrate 1 whereby these input lead terminal 5a, earth lead terminal 6 and output lead terminal 5b are arranged in the same plane.

However, with the above described three-terminal capacitor, the dielectric substrate 1 is not that thick, so that, as shown in FIG. 5, it is difficult to bend the lead terminals 5a and 5b so that an angle $\theta$ formed by a straight line $l_1$ meeting at right angles with the input lead terminal 5a and the output lead terminal 5b and a straight line $l_2$ passing the first bent portion 5c and the second bent portion 5d of the input lead terminal 5a and the output lead terminal 5b may be small.

The second bent portions 5d of the input lead terminal 5a and the output lead terminal 5b adjacent a printed board enter into a hole of the printed board whereby the capacitor body 4 is inclined toward the direction shown by an arrow $A_1$ in FIG. 5 (lowering the component mounting density on the printed board and deteriorating operability with an increase of this angle $\theta$) when a three-terminal capacitor is provided on a printed board by means of an automatic part-inserting apparatus and the like.

In addition, a disadvantage has occurred in that the input lead terminal 5a and the output lead terminal 5b are brought into contact with an edge portion of the dielectric substrate 1 due to the pressure required for mounting a three-terminal capacitor on a printed board thereby decreasing the angle $\theta$ when the three-terminal capacitor is provided on the printed board whereby breakage of the dielectric substrate occur.

Thus, it is an object of the present invention to provide a three-terminal capacitor wherein a bending angle of lead terminal is increased by bending a bent portion of lead terminal once outward relative to a capacitor body in a convex manner to increase a length of the bent portion whereby bend of the capacitor body can be prevented when it is inserted into a printed board by means of an automatic part-inserting apparatus and the like.

It is an other object of the present invention to provide a three-terminal capacitor wherein the breakage of a dielectric substrate when it is inserted into a printed board by means of an automatic part-inserting apparatus and the like can be prevented.

Figure 1:
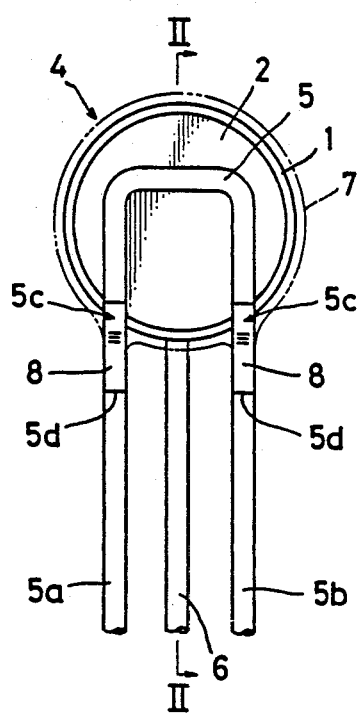
Figure 2:
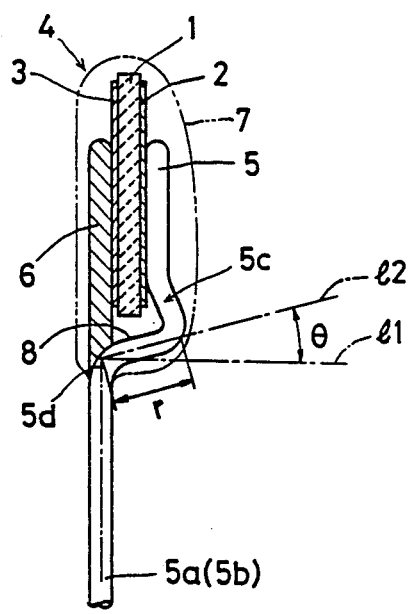

The above and other objects and features of the invention will appear more fully hereinafter from a consideration of the following description taken in connection with the accompanying drawings wherein one example is illustrated by way of example, in which FIG. 1 is a front view showing the inside construction of a three-terminal capacitor according to the present invention, FIG. 2 is a longitudinal sectional side view of FIG. 1 taken along an arrow II—II thereof, FIG. 3 is an equivalent circuit of a three-terminal capacitor, FIG. 4 is a front view showing the inside construction of the conventional three-terminal capacitor, and FIG. 5 is a longitudinal sectional side view of FIG. 4 taken along an arrow V—V thereof.

A three-terminal capacitor according to the present invention has the same basic construction as in the conventional three-terminal capacitor as shown in FIGS. 4 and 5.

Hereinafter the corresponding parts are similarly marked.

Referring to FIGS. 1 and 2, an input lead terminal 5a and an output lead terminal 5b at a first bent portion 5c are bent toward the direction opposite to an electrode 3 arranged in opposition to an electrode 2 in the vicinity of the circumferential edge of the main surface on which the electrode 2 of a capacitor body 4 is formed and then bent toward an earth lead terminal 6. In other words, the first bent portion 5c is once bent outward relative to the capacitor body 1 in a convex manner to increase a length r of a portion 8 between the first bent portion 5c and a second bent portion 5d.

Thus, it is easy to bend the input lead terminal 5a and the output lead terminal 5b so that they may be nearly parallel with the side surface of a dielectric substrate 1 while passing below the circumferential edge portion of the main surface on which the electrode 2 of the dielectric substrate 1 is formed. Thus an angle $\theta$ formed by a straight line $l_1$ meeting at right angles with the input lead terminal 5a, the output lead terminal 5b and the earth lead terminal 6 and a straight line $l_2$ parallel to the portion 8 having a length of r can be made small even though the dielectric substrate 1 is not so thick. In the example this angle $\theta$ could be reduced to 35° or less.

Accordingly, even though a three-terminal capacitor is inserted into a printed board by means of an automatic part-insering apparatus and the like, the bent portion of the lead terminal adjacent to the printed board is difficult to force into a hole of the printed board thus preventing a three-terminal capacitor from being mounted on a printed board in an inclined manner. Also pressure can be absorbed by a portion following the first bent portion 5c when a three-terminal capacitor is mounted on a printed board by means of an automatic part-inserting apparatus and the like whereby shock imparted to a three-terminal capacitor can be reduced.

In addition, the bent portions of lead terminals are not brought into contact with a circumferential edge portion of the main surfaces of a dielectric substrate of a three-terminal capacitor. Thus, the breakage of dielectric substrate does not occur even though a stress and the like are exerted on the lead terminals.

In the above described preferred embodiment a three-terminal capacitor, in which an input lead terminal 5a and an output lead terminal 5b are bent was described. The present invention may be applied also to a three-terminal capacitor wherein an input lead terminal 5a and an output lead terminal 5b are not bent, but an earth lead terminal 6 is bent toward the input lead terminal 5a side and the output lead terminal 5b side. In addition, one piece of U-shaped lead wire is used for the input lead terminal 5a and the output lead terminal 5b but two pieces of independent I-shaped lead wire may be used.

Furthermore, although an electrode 2 and an electrode 3 provided on both main surfaces of a dielectric substrate 1 were overall surface electrodes in the above described preferred embodiment, an electrode formed on the main surface of the side, from which two pieces of lead terminal are drawn out, may be a segmented electrode divided into two parts. In this case, I-shaped independent lead terminals are used.

Additionally, when an earth lead terminal 6 is bent, it is increased in length thus increasing an inductance component. Accordingly, since a noise-eliminating effect is lowered, it is not so desirable to use such a three-terminal capacitor for a noise filter.

We claim:

1. A three-terminal capacitor comprising:

a first electrode and a second electrode between which a dielectric substrate extends;

a first lead terminal comprised of two pieces disposed parallel with one another extending from said first electrode, and a second lead terminal extending from said second electrode;

one of said first and second lead terminals extending straight from its respective electrode;

the other of said first and second lead terminals having a first convex section bent outward from a first end from the face of its respective electrode and then bent inward to a second end spaced from an edge of the substrate, and having a second section bent from said second end and extending parallel with said one of said first and second lead terminals; and having an angle, defined between the inward bent portion of said convex section and a line in a plane in which said convex section is disposed and perperdicular to said one lead terminal, equal to at most approximately 35°.

2. The three-terminal capacitor claimed in claim 1 wherein, said first lead terminal is a substantially U-shaped metallic wire.

3. The three-terminal capacitor claimed in claim 1 wherein, said two pieces of said first lead terminal are each an I-shaped lead wire.

4. The three-terminal capacitor claimed in claim 1 wherein, said first lead terminal is said other of said first and second lead terminals.

5. A three-terminal capacitor as claimed in claim 1 wherein, said first lead terminal is said one of said first and second lead terminals.

* * * * *

UNITED STATES PATENT AND TRADEMARK OFFICE
CERTIFICATE OF CORRECTION

PATENT NO. : 4,827,634

DATED : May 9, 1989

INVENTOR(S) : Yukio Sakamoto et al

It is certified that error appears in the above-identified patent and that said Letters Patent is hereby corrected as shown below:

Title page Item (19), "Tanabe" should read -- Sakamoto et al--.

Item (54) Inventors should read

--Inventor: Yukio Sakamoto, Fukui, Japan
          Yasuo Fujiki, Takefu, Japan
          Yoshikazu Hata, Fukui, Japan--.

Signed and Sealed this

Twenty-third Day of January, 1990

*Attest:*

JEFFREY M. SAMUELS

*Attesting Officer*    *Acting Commissioner of Patents and Trademarks*